(12) United States Patent
Xiao et al.

(10) Patent No.: US 12,356,359 B2
(45) Date of Patent: Jul. 8, 2025

(54) SYSTEMS AND METHODS TO TRIGGER SENDING UPLINK MESSAGES

(71) Applicant: ZTE CORPORATION, Guangdong (CN)

(72) Inventors: Huahua Xiao, Shenzhen (CN); Guozeng Zheng, Shenzhen (CN); Zhaohua Lu, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 351 days.

(21) Appl. No.: 17/870,757

(22) Filed: Jul. 21, 2022

(65) Prior Publication Data

US 2023/0007616 A1    Jan. 5, 2023

Related U.S. Application Data

(63) Continuation of application No. PCT/CN2020/121449, filed on Oct. 16, 2020.

(51) Int. Cl.
*H04W 64/00*     (2009.01)
*H04L 5/00*     (2006.01)

(52) U.S. Cl.
CPC ........... *H04W 64/00* (2013.01); *H04L 5/0053* (2013.01)

(58) Field of Classification Search
CPC ....... H04W 64/00; H04L 5/0053; Y02D 30/70
See application file for complete search history.

(56) References Cited

U.S. PATENT DOCUMENTS

| | | | |
|---|---|---|---|
| 11,882,541 B2 * | 1/2024 | Khoryaev | H04W 74/0833 |
| 2019/0182794 A1 * | 6/2019 | Wong | H04W 52/0216 |
| 2021/0258777 A1 * | 8/2021 | Liu | H04W 36/0038 |
| 2021/0314195 A1 * | 10/2021 | Lin | H04W 64/00 |
| 2022/0167301 A1 * | 5/2022 | Goyal | H04L 5/0048 |
| 2022/0209997 A1 * | 6/2022 | Manolakos | H04L 25/0226 |
| 2022/0272513 A1 * | 8/2022 | Park | H04W 4/70 |
| 2022/0337456 A1 * | 10/2022 | Kwak | H04W 72/23 |
| 2023/0156594 A1 * | 5/2023 | Li | H04W 52/0212 370/311 |
| 2023/0189198 A1 * | 6/2023 | Dong | H04W 68/005 455/456.1 |

(Continued)

FOREIGN PATENT DOCUMENTS

| CN | 109479255 A | 3/2019 |
|---|---|---|
| CN | 110972054 A | 4/2020 |

(Continued)

OTHER PUBLICATIONS

Extended European Search Report on EP Appln. No. 20 957 204.9 dated Apr. 11, 2023 (9 pages).

(Continued)

*Primary Examiner* — Kenneth T Lam
(74) *Attorney, Agent, or Firm* — Foley & Lardner LLP (57) ABSTRACT

A wireless communication method includes receiving, by a wireless communication device from a wireless communication node, a downlink control message; and sending, by the wireless communication device to the wireless communication node, in response to receiving the downlink control message, an uplink signal, wherein the uplink signal is configured for the wireless communication node to position the wireless communication device.

17 Claims, 5 Drawing Sheets

(56) References Cited

U.S. PATENT DOCUMENTS

| | | | | |
|---|---|---|---|---|
| 2023/0224850 A1* | 7/2023 | Yerramalli | ........ | H04W 74/0833 455/456.1 |
| 2023/0319766 A1* | 10/2023 | Manolakos | ........... | H04L 5/0051 455/456.1 |
| 2024/0137864 A1* | 4/2024 | Zhou | ..................... | H04W 76/15 |

FOREIGN PATENT DOCUMENTS

| | | |
|---|---|---|
| WO | WO-2020/091658 A1 | 5/2020 |
| WO | WO-2020/160053 A1 | 8/2020 |
| WO | WO-2020/163597 A1 | 8/2020 |
| WO | WO-2020/166797 A1 | 8/2020 |
| WO | WO-2020/197829 A1 | 10/2020 |

OTHER PUBLICATIONS

First Examination Report on IN Appl. Ser. No. 202227041776 dated Sep. 5, 2023 (6 pages).
International Search Report and Written Opinion for PCT Appl. No. PCT/CN2020/121449 mailed Jul. 14, 2021 (8 pages).
Communication pursuant to Article 94(3) EPC for EP Appl. No. 20957204.9, dated Jul. 16, 2024 (8 pages).

\* cited by examiner

FIG. 1

| Bit field | Short Message Indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

SYSTEMS AND METHODS TO TRIGGER SENDING UPLINK MESSAGES

CROSS-REFERENCE TO RELATED APPLICATION

This application claims the benefit of priority under 35 U.S.C. § 120 as a continuation of PCT Patent Application No. PCT/CN2020/121449, filed on Oct. 16, 2020, the disclosure of which is incorporated herein by reference in its entirety.

TECHNICAL FIELD

The disclosure relates generally to wireless communications and, more particularly, to systems and methods for determining a positioning of a user equipment while not connected in radio communication.

BACKGROUND

Trajectory tracking functions are widely used across many applications, such as childcare tracking, etc. These applications require periodic positions that, without supporting idle/inactive mode positioning, requires User Equipment (UE) to switch between connected and idle modes continuously, which leads to a higher amount of signaling overhead. Moreover, in some scenarios where the flow of people needs to be counted or there are a greater number of user locations to be obtained, all related UEs must return to connected mode in order to perform positioning, which would lead to overly large UE power consumption. Therefore, if positioning is able to be performed without entering connected mode, both the UE power consumption and the signaling overhead could be reduced. As such, idle/inactive positioning benefits at least UE-assisted positioning, NG RAN node assisted positioning, and UE-based positioning.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, User Equipment (UE) performs a method including receiving, from a Base Station (BS), a downlink control message and sending, in response to receiving the downlink control message, an uplink signal configured for the BS to position the UE.

In other arrangements, BS performs a method including transmitting, to a UE, a downlink control message, and receiving, from the UE, in response to transmitting the downlink control message, an uplink signal configured for the BS to position the UE.

In other embodiments, a wireless communications apparatus comprising a processor and a memory, wherein the processor is configured to read code from the memory and implement a method including receiving, from a Base Station (BS), a downlink control message and sending, in response to receiving the downlink control message, an uplink signal configured for the BS to position the UE.

In other embodiments, a computer program product comprising a computer-readable program medium code stored thereupon, the code, when executed by a processor, causing the processor to implement a method including receiving, from a Base Station (BS), a downlink control message and sending, in response to receiving the downlink control message, an uplink signal configured for the BS to position the UE.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
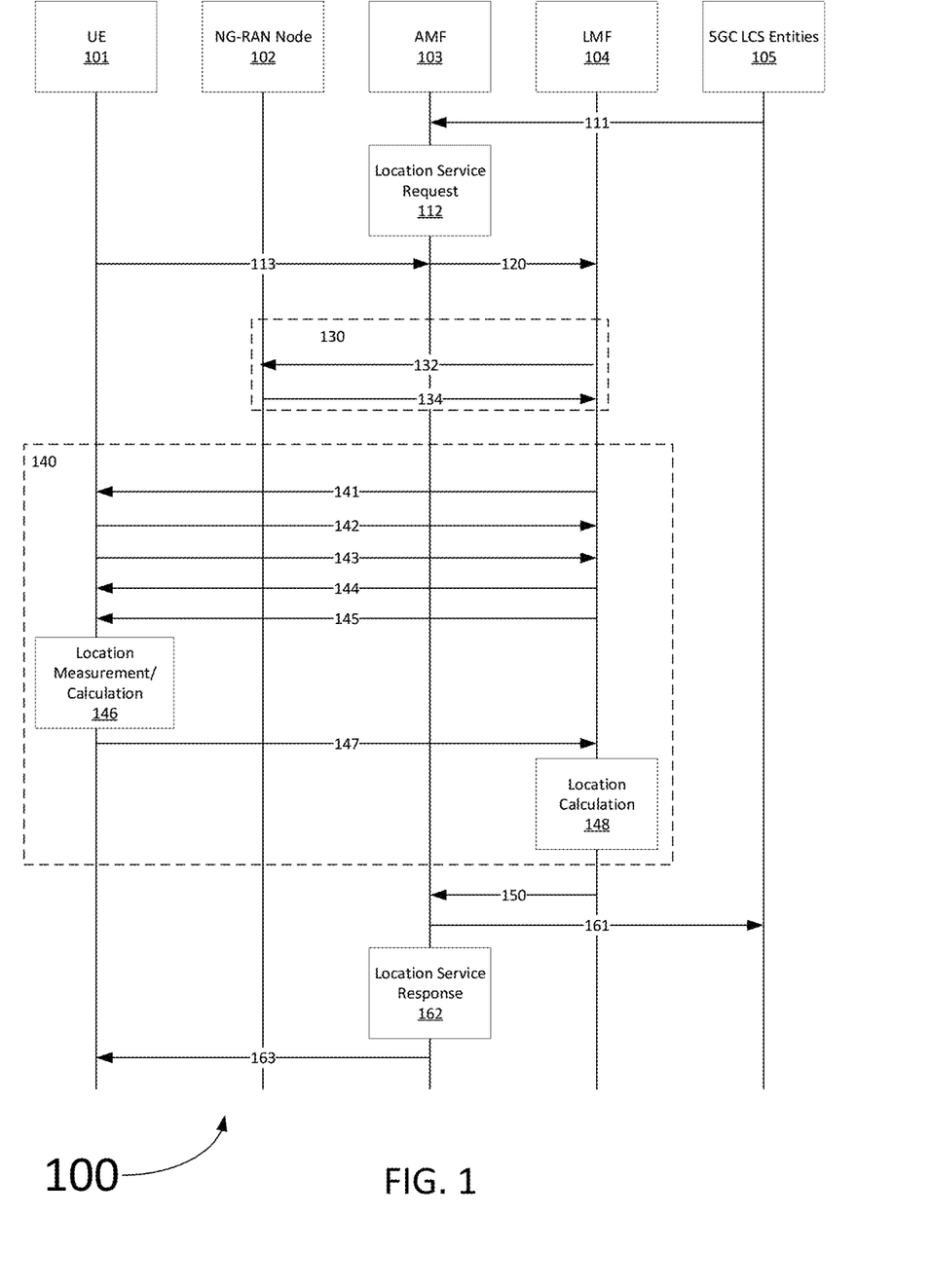
FIG. 1 is a flowchart illustrating a method for determining a location of a UE, according to various embodiments.

FIG. 1 is a flowchart illustrating a method 100 for determining a location of a UE (e.g., wireless communication device) 101, according to various embodiments. As shown in FIG. 1, there are 5 entities involved in the method 100: UE 101, Next Generation-Radio Access Network (NG-RAN) Node (e.g., BS or wireless communication node) 102, Access and Mobility Management Function (AMF) 103, Location Management Function (LMF) 104, and 5G system (5GS) Location Services (LCS) Entities 105. In some embodiments, the LMF 104 is performed by a core network. At step 111, the 5G LCS Entities 105 transmits a location service request to the AMF 103. At step 112, the AMF 103 processes the location service request. At step 113, the UE 101 transmits a location service request to the AMF 103, which then transmits a location services request to the LMF 104 at step 120. Next, the NG-RAN Node procedures are performed at step 130, which include an information request being sent from the LMF 104 to the NG-RAN Node 102 at step 132 and an information response being returned from the NG-RAN Node 102 to the LMF 104 at step 134.

Then, the UE procedure is performed at step 140, which begins with the LMF 104 requesting the capabilities of the UE 101 at step 141. At step 142, the UE 101 provides its capabilities to and, at step 143, requests assistance data from the LMF 104. The LMF 104 provides assistance data at step 144 and requests location information from the UE 101 at step 145. At step 146, the UE 101 measure a transmission time between the UE 101 and the BS 102, a transmission time between different BSs, a distance between the UE 101 and the BS 102, and/or a distance between different BSs, which the UE 101 provides to the LMF 104 at step 147. Finally, at step 148, the LMF 104 calculates the location. It should be noted that the UE 101 may perform step 146 in response to (or otherwise triggered by) the UE 101 receiving a reference signal (e.g., a Downlink Positioning References Signal (DL PRS) from the BS 102, which will be discussed in further detail below.

At step 150, the LMF 104 responds to the location service request from step 120. Then, at step 161, the AMF 103 provides a location services response to the 5G LCS Entities 105, processes the location services response at step 162, and provides the location services response to the UE 101 at step 163.

Referring to step 140, the positioning of the UE 101 can be determined even when the UE 101 is not in a RRC_connected mode (i.e., either RRC_idle or RRC_inactive). The communication from the BS (via the LMF 104) to the UE 101 takes the form of a downlink control message (e.g., a paging DCI), which may include one or more bits configured to trigger transmission of a first reference signal (e.g., a Sounding Reference Signal (SRS)), transmission of a preamble, or reception of a second reference signal (e.g., a Downlink Positioning References Signal (DL PRS) or a synchronization signal).

Figure 2:
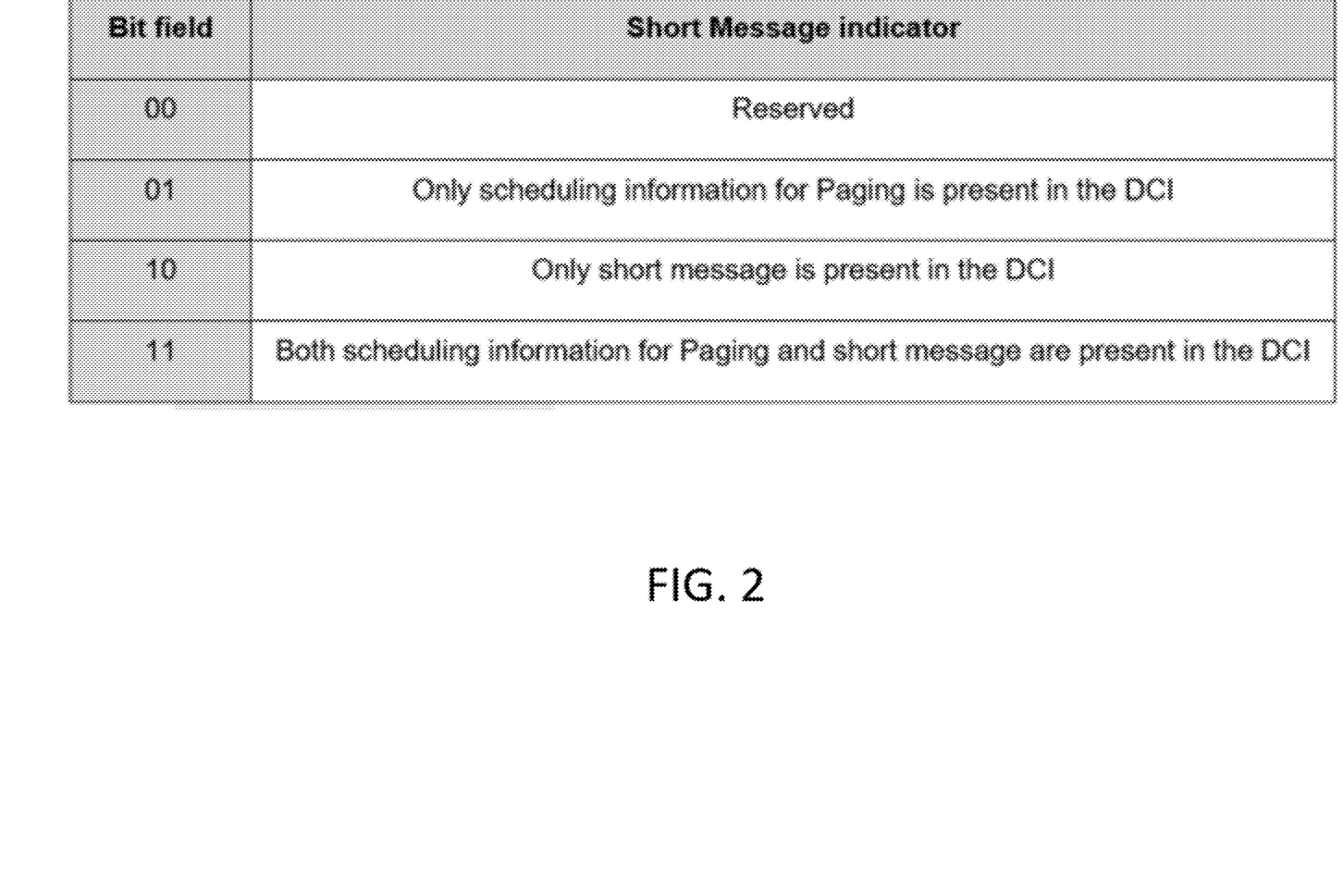
FIG. 2 is a table showing bit field values with related Short Message indicator, according to various embodiments.

In various embodiments, this downlink control message may include a paging message scheduled by the downlink control message, and may include one or more bits to indicate whether the downlink control message includes scheduling information for positioning. For example in Table 1, the one or more bits can indicate that the scheduling information is configured for positioning only, or configured for both paging and positioning. Scheduling information for positioning may refer to the downlink control message or the paging message being configured to trigger/activate uplink signal and/or downlink signal.

TABLE 1

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

In various embodiments, the UE 101 is configured to send an uplink signal back to the BS as triggered/activated by downlink control message or a paging message in order to assist the BS in positioning the UE 101. Alternatively, the UE 101 is configured to receive an downlink from the BS as triggered/activated by downlink control message or a paging message in order to assist the UE in positioning measurement. The uplink signal may include at least one of a SRS or a preamble. The downlink signal may include at least one of a DL PRS or a synchronization signal.

The uplink signal and downlink signal may be configured when the UE was last in an RRC_connected state (which is sometimes referred to as an RRC_active state) or as one of a plurality of common uplink/downlink signals, such as uplink signal and downlink signals configured by a System Information Block (SIB). Further, the uplink signal and/or downlink signal may be dedicated for the UE 101 such that the BS is able to use the dedicated uplink signal in order to differentiate UEs from each other. For example, a sequence of the uplink signal and/or a sequence of the downlink signal may be associated with the UE 101. In another example, a time allocation of the uplink signal and/or a time allocation of the downlink signal may be associated with the UE 101. In yet another example, a frequency allocation of the uplink signal and/or a frequency allocation of the downlink signal may be associated with the UE 101.

The preconfigured uplink signal and/or downlink signal may be updated by the downlink control message or the paging message. At least one of the following may be updated: the sequence of uplink signal and/or downlink signal, the time allocation of uplink signal and/or downlink signal, or the frequency allocation of uplink signal and/or downlink signal. Furthermore, the update may be according to (or associated with) a ID contained in the paging message, where the ID is used to uniquely identify a UE.

The downlink control message may activate the uplink transmission differently depending on whether the UE is RRC_idle or RRC_inactive. When the UE 101 is in an RRC_inactive state, the Physical Random Access Channel (PRACH) is contention free, and SRS may be configured when the UE 101 is in RRC_connected state. While the UE 101 is in an RRC_idle state, the PRACH is contention-based and the group common SRS is used for positioning purposes. The contention-based PRACH may be changed to contention free if, for example, the DCI/paging message (i.e., PDSCH) reconfigures the sequence or frequency domain of the triggered/activated reference signals.

In addition to the downlink control message, the UE 101 may also receive assistance data (see step 144) that configures the UE 101 to transmit a first reference signal (e.g., uplink signal) either periodically, aperiodically, or semi-persistently. For example, a time-domain behavior of the uplink signal can be configured by the assistance date as a parameter (e.g., resource Type) to be as one of aperiodic, periodic, or semi-persistent. The assistance data can be included in at least one of three transmissions: in a SIB, in previous assistance data received when the UE was in RRC_connected state, or in scheduling information in the downlink control message. The assistance data may also include a PRS configuration.

In some embodiments, upon receiving the downlink message and/or assistance data, the UE 101 selects a resource from a plurality of resources that are pre-configured for positioning, and sends the preamble (i.e., the uplink signal) using the selected resource. Alternatively, the UE 101 sends the uplink signal as a Msg3 (i.e., the message sent by the UE 101 during step 3 of PRACH) carrying at least one of a User Equipment Identifier (UEID) and/or a Positioning Identifier.

Because the UE 101 is not in RRC_connected state, certain assumptions may be made about a Timing Advance (TA) for transmitting the uplink message. In some embodiments, the UE 101 receives a TA that was configured when the UE 101 was last in an RRC_connected state. In other embodiments, the UE 101 sends a first random access message to the BS and receives, in response, a second random access message that indicates a TA calculated based on the first random access message. If in a 4-step random access process, the first random access message could be Msg1 while the second random access message could be Msg2. Alternatively, if in a 2-step random access process, the first random access message could be MsgA while the second random access message could be MsgB.

In some embodiments, the UE 101 transmits the uplink signal using a spatial parameter that corresponds to a beam used by the UE 101 to receive messages from the BS (or send massages to the BS) and is selected according to information corresponding to the PRACH. Such a spatial parameter, which include a spatial domain receive filter and a spatial domain transmission filter, may sometimes be referred to as a spatial relations or spatial Rx parameter. This information includes a Synchronization Signal Block (SSB), a Channel State/Status Information Reference Signal (CSI-RS), or a Control Resource Set (CORESET). In some embodiments, the UE 101 can send the uplink signal using the spatial parameter, which may be selected according to a monitor occasion in which the downlink control message is received. For example, the monitoring occasion may include one or more occasions where the UE 101 can receive a paging message.

In addition, an Early Data Transmission (EDT) can transmit part of the uplink signal. Here, the uplink signal includes K Reference Signal Time Difference (RSTD), where K is the smallest number of RSTDs, and the cell ID.

In some embodiments, if the PRACH fails and if the Msg3 transmission fails, the assistance data still uses the current value and re-transmits the Msg3 with Hybrid Automatic Repeat ReQuest (HARQ). If the PRACH fails and if there is PRACH competition failure, the assistance data may need to recalculate a new value and to start the competition again. Alternatively, if the PRACH fails, it may be due to the reported measurement result falling within the T time window.

For NG-RAN node assisted positioning, in order to use positioning SRS for a position of the UE, the terminal transmitting the SRS must be known. If PRACH is completed, the UE may be in RRC_CONNECTED (or RRC_active) state, so the UE does not need to be changed from the RRC_inactive or RRC_idle states. However, if PRACH is not completed, the NodeB can determine which user transmits the SRS by one of two ways. By dividing the preamble resources into at least two sets, at least one of which is used for positioning, the NG-RAN node can know which UE transmits the SRS if the preamble for positioning is sent by the UE. Alternatively, the NG-RAN node relies on the Msg3 carrying the UE-ID and/or the positioning identifier. As such, the UE that has accessed successfully (e.g., after receiving the Msg4) can directly transmit SRS but does not change to the connected state (i.e., stays as RRC_inactive).

In some embodiments, reserved bits are designed for reserved code point in a Short Message indicator that can be used in one of two ways: for scheduling information for positioning, or for scheduling information for paging and positioning. FIG. 2 is a table showing bit field values with related Short Message indicator, according to various embodiments.

Figure 3A:
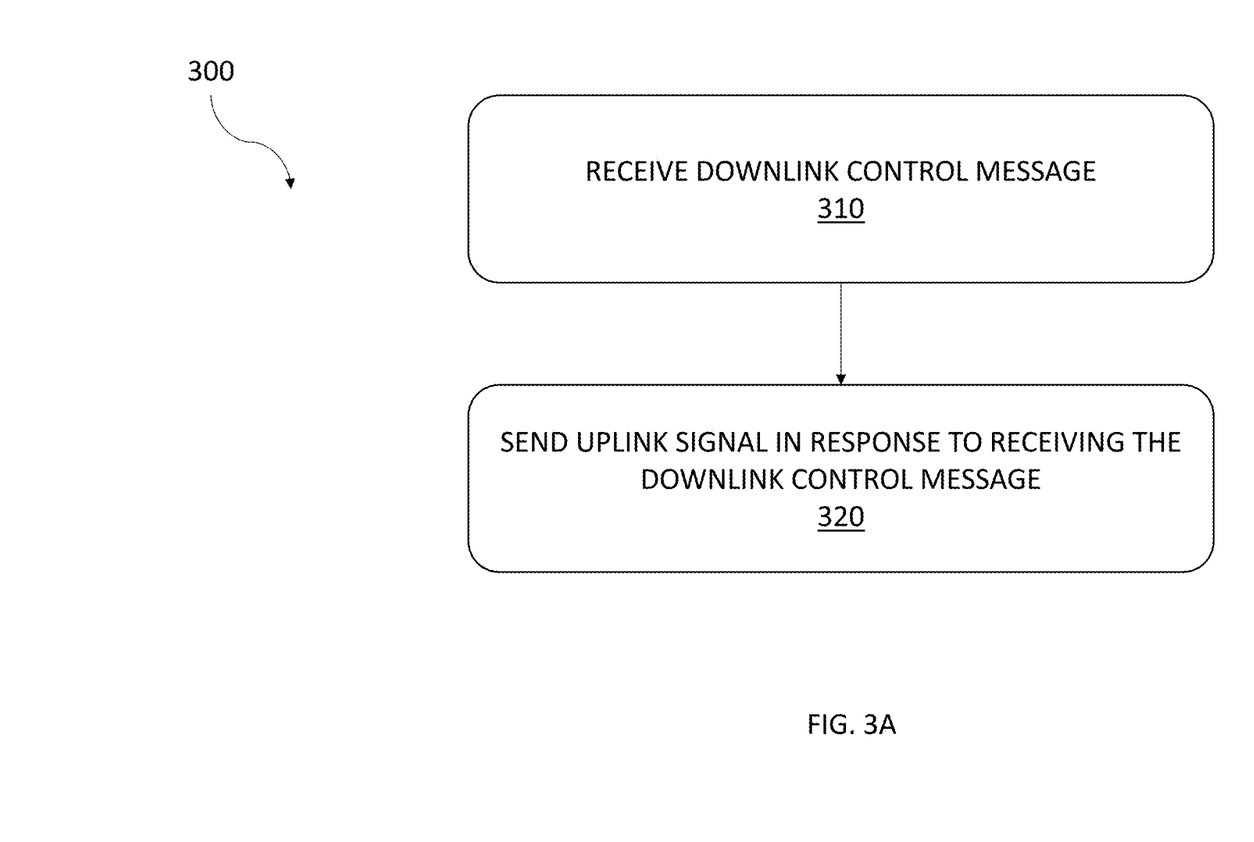
FIG. 3A is a flowchart diagram illustrating an example wireless communication method for positioning a UE that is not in a RRC_connected state, according to various embodiments.

When the reserved code point in a Short Message indicator is used for positioning, the 6 reserved bits of the paging message are used to trigger the SRS similarly to the above. The preamble is triggered based on the indicated preamble index, or the reserved bits trigger PRS. If the reserved bits trigger the PRS, the reserved bits are used by the BS to send the PRS after a certain interval and used by the UE to receive the PRS at that time. FIG. 3A is a flowchart diagram illustrating an example wireless communication method 300 for positioning a UE while the UE is not in the RRC_connected state, according to various arrangements. Referring to FIGS. 1-2, the method 300 can be performed by a UE. Method 300 begins at step 310 where the UE receives a downlink control message (e.g., a paging message) from a BS. Next, at step 320, the UE sends an uplink signal (e.g., a SRS or a preamble) in response to receiving the downlink control message. The uplink signal is configured for the BS to position the UE, and may be dedicated for the UE.

In some embodiments, the UE then receives, from the BS, assistance data that configures the time-domain behavior of the uplink signal to be either aperiodic, periodic, or semi-persistent. This assistance data may be included in a SIB, the previous assistance data received when the UE was last in RRC_connected state, or scheduling information of the downlink control message.

In some embodiments, the UE selects a resource from a plurality of resources that are pre-configured for positioning and then sends a preamble that corresponds to the uplink symbol to the BS using the selected resource. The UE may also send a Msg3 that carries at least one of a UEID or positioning identifier. This Msg3 corresponds to the uplink signal that is configured for the BS to position the UE.

In some embodiments, the UE sends a first random access message to the BS, and receives, from the BS, a second random access message indicating a TA based on the first random access message. Then, the UE sends the uplink signal using the TA.

In some embodiments, the UE sends the uplink using a spatial parameter. This spatial parameter may be selected according to a monitor occasion in which the downlink control message is received or according to one or more pieces of information that correspond to a PRACH. These one or more pieces of information include SSB, CSI-RS, or CORESET.

In some embodiments, the downlink control message includes one or more bits that configure the uplink signal to position the UE. These bits may also be configured to trigger at least one of a transmission of a first reference signal (e.g., SRS), a transmission of a preamble, or the reception of a second reference signal (e.g., PRS).

Figure 3B:
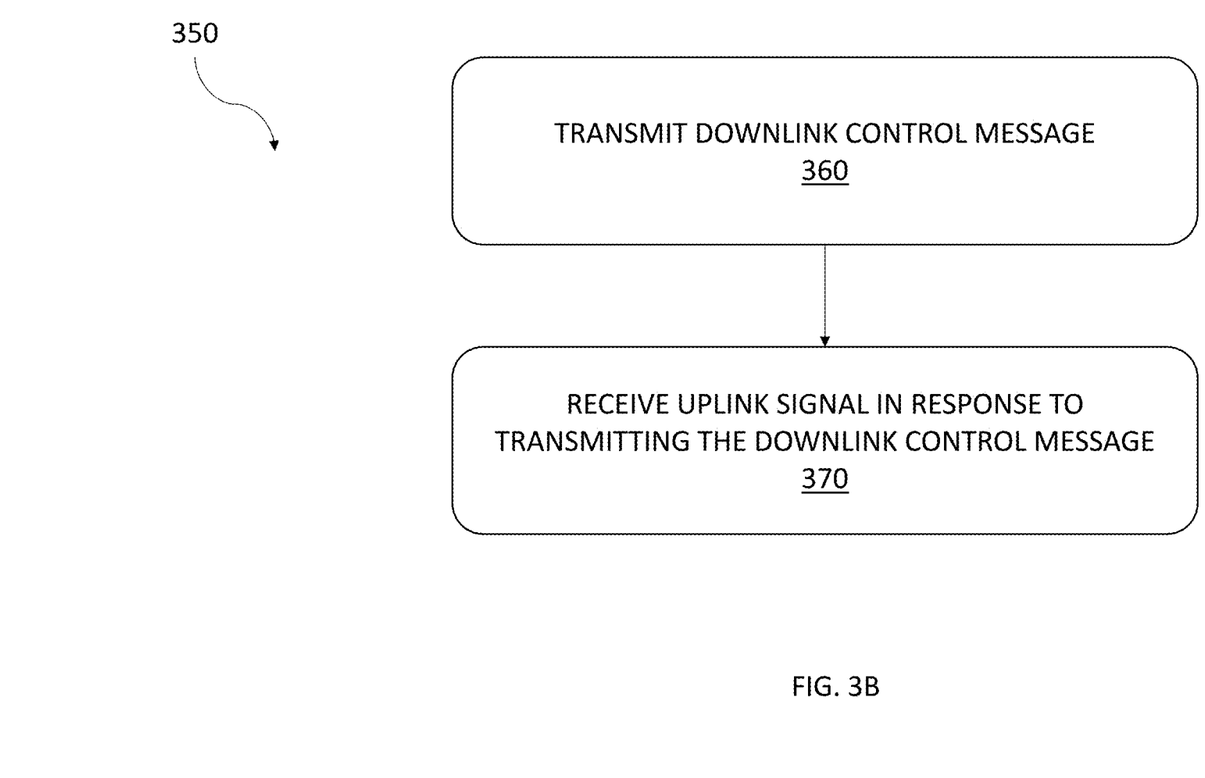
FIG. 3B is a flowchart diagram illustrating another example wireless communication method for positioning a UE that is not in a RRC_connected state, according to various embodiments.

FIG. 3B is a flowchart diagram illustrating another example wireless communication method 350 for positioning a UE while the UE is not in the RRC_connected state, according to various arrangements. Referring to FIGS. 1-2, the method 350 can be performed by a BS. Method 350 begins at step 360 where the BS transmits a downlink control message (e.g., a paging message) to a UE. Next, at step 370, the BS receives an uplink signal (e.g., a SRS or a preamble) in response to transmitting the downlink control message. The uplink signal is configured for the BS to position the UE, and may be dedicated for the UE. In some embodiments, the BS receives the preamble (corresponding to the uplink signal) using a resource selected from a plurality of resources that are pre-configured for positioning.

In some embodiments, the BS transmits, to the UE, assistance data that configures the time-domain behavior of the uplink signal to be aperiodic, periodic, or semi-persistent. This assistance data may be included in at least one of an SIB, in previous assistance data received when the UE was last in an RRC_connected state, or in scheduling information of the downlink control message.

In some embodiments, the BS receives, from the UE, a Msg3 corresponding to the uplink signal that carries at least one of a UEID or positioning identifier.

In some embodiments, the BS transmits a TA configured when the UE was last in an RRC_connected state, which is then used by the UE to send the uplink signal to the BS. In other embodiments, the BS first receives a first random access message. The BS then transmits, to the UE, a second random access message with a TA configured based on the first random access message. The BS then receives the uplink signal from the UE, which sent the uplink signal using the TA.

In some embodiments, the BS receives the uplink signal sent using a spatial parameter. This spatial parameter may be selected according to the monitor occasion in which the downlink control message was received or according to one or more pieces of information corresponding to a PRACH. These pieces of information include at least one of a SSB, CSI-RS, or CORESET.

In some embodiments, upon receiving the SRS, the BS may use it to at least one of: measure a transmission time between the UE and the BS, a transmission time between different BSs, a distance between the UE and the BS, or a distance between different BSs. For example, the BS can use the SRS to estimate a channel, and based on the estimated channel, the BS can perform at least one of the above-described measurements. In some embodiments, the BS can use the measurement result(s) to calculate a position of the UE.

In some other embodiments, the downlink control message can further trigger the UE, which may have been in the non-RRC_connected state, to receive a downlink (e.g., reference) message. The reference message can include a Positioning References Signal (PRS). Upon receiving the PRS, the UE may use it to at least one of: measure a transmission time between the UE and the BS, a transmission time between different BSs, a distance between the UE and the BS, or a distance between different BSs (e.g., step 146 in FIG. 1). In an example, the LMF (e.g., 104 of FIG. 1) can use the measurement result(s) to calculate the UE's position. In another example, the UE can use the measurement result(s) to calculate its own position.

Figure 4A:
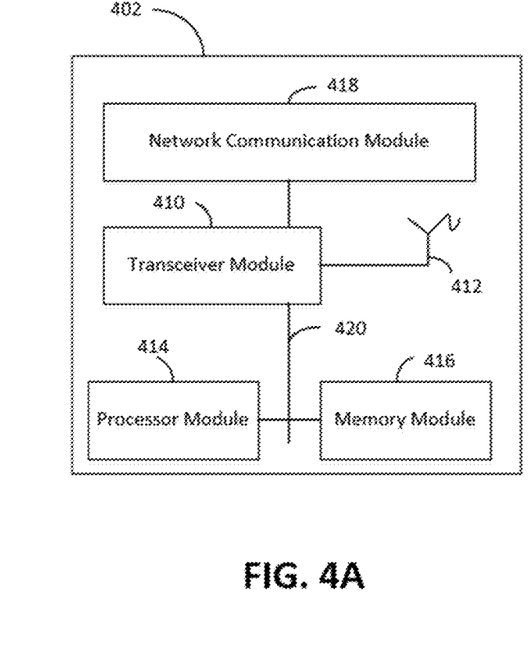
FIG. 4A illustrates a block diagram of an example base station, according to various embodiments.
Figure 4B:
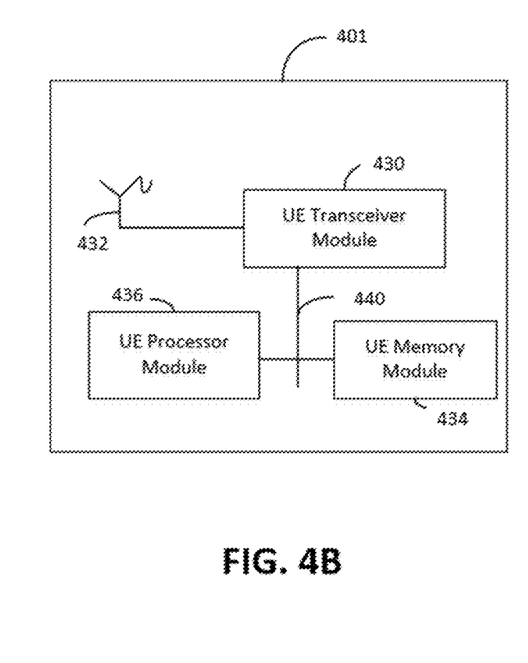
FIG. 4B illustrates a block diagram of an example user equipment, according to various embodiments.

FIG. 4A illustrates a block diagram of an example BS 402, in accordance with some embodiments of the present disclosure. FIG. 4B illustrates a block diagram of an example UE 401, in accordance with some embodiments of the present disclosure. The UE 401 (e.g., a wireless communication device, a terminal, a mobile device, a mobile user, and so on) is an example implementation of the UEs described herein, and the BS 402 is an example implementation of the BS described herein.

The BS 402 and the UE 401 can include components and elements configured to support known or conventional operating features that need not be described in detail herein. In one illustrative embodiment, the BS 402 and the UE 401 can be used to communicate (e.g., transmit and receive) data symbols in a wireless communication environment, as described above. For instance, the BS 402 can be a BS (e.g., gNB, eNB, and so on), a server, a node, or any suitable computing device used to implement various network functions.

The BS 402 includes a transceiver module 410, an antenna 412, a processor module 414, a memory module 416, and a network communication module 418. The module 410, 412, 414, 416, and 418 are operatively coupled to and interconnected with one another via a data communication bus 420. The UE 401 includes a UE transceiver module 430, a UE antenna 432, a UE memory module 434, and a UE processor module 436. The modules 430, 432, 434, and 436 are operatively coupled to and interconnected with one another via a data communication bus 440. The BS 402 communicates with the UE 401 or another BS via a communication channel, which can be any wireless channel or other medium suitable for transmission of data as described herein.

As would be understood by persons of ordinary skill in the art, the BS 402 and the UE 401 can further include any number of modules other than the modules shown in FIGS. 4A and 4B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 430 includes a radio frequency (RF) transmitter and a RF receiver each including circuitry that is coupled to the antenna 432. A duplex switch (not shown) may alternatively couple the RF transmitter or receiver to the antenna in time duplex fashion. Similarly, in accordance with some embodiments, the transceiver 410 includes an RF transmitter and a RF receiver each having circuitry that is coupled to the antenna 412 or the antenna of another BS. A duplex switch may alternatively couple the RF transmitter or receiver to the antenna 412 in time duplex fashion. The operations of the two-transceiver modules 410 and 430 can be coordinated in time such that the receiver circuitry is coupled to the antenna 432 for reception of transmissions over a wireless transmission link at the same time that the transmitter is coupled to the antenna 412. In some embodiments, there is close time synchronization with a minimal guard time between changes in duplex direction.

The UE transceiver 430 and the transceiver 410 are configured to communicate via the wireless data communication link, and cooperate with a suitably configured RF antenna arrangement 412/432 that can support a particular wireless communication protocol and modulation scheme. In some illustrative embodiments, the UE transceiver 430 and the transceiver 410 are configured to support industry standards such as the Long Term Evolution (LTE) and emerging 5G standards, and the like. It is understood, however, that the present disclosure is not necessarily limited in application to a particular standard and associated protocols. Rather, the UE transceiver 430 and the BS transceiver 410 may be configured to support alternate, or additional, wireless data communication protocols, including future standards or variations thereof.

The transceiver 410 and the transceiver of another BS (such as but not limited to, the transceiver 410) are configured to communicate via a wireless data communication link, and cooperate with a suitably configured RF antenna arrangement that can support a particular wireless communication protocol and modulation scheme. In some illustrative embodiments, the transceiver 410 and the transceiver of another BS are configured to support industry standards such as the LTE and emerging 5G standards, and the like. It is understood, however, that the present disclosure is not necessarily limited in application to a particular standard and associated protocols. Rather, the transceiver 410 and the transceiver of another BS may be configured to support alternate, or additional, wireless data communication protocols, including future standards or variations thereof.

In accordance with various embodiments, the BS 402 may be a BS such as but not limited to, an eNB, a serving eNB, a target eNB, a femto station, or a pico station, for example. The BS 402 can be an RN, a DeNB, or a gNB. In some embodiments, the UE 401 may be embodied in various types of user devices such as a mobile phone, a smart phone, a personal digital assistant (PDA), tablet, laptop computer, wearable computing device, etc. The processor modules 414 and 436 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 414 and 436, respectively, or in any practical combination thereof. The memory modules 416 and 434 may be realized as RAM memory, flash memory, ROM memory, EPROM memory, EEPROM memory, registers, a hard disk, a removable disk, a CD-ROM, or any other form of storage medium known in the art. In this regard, memory modules 416 and 434 may be coupled to the processor modules 414 and 436, respectively, such that the processors modules 414 and 436 can read information from, and write information to, memory modules 416 and 434, respectively. The memory modules 416 and 434 may also be integrated into their respective processor modules 414 and 436. In some embodiments, the memory modules 416 and 434 may each include a cache memory for storing temporary variables or other intermediate information during execution of instructions to be executed by processor modules 414 and 436, respectively. Memory modules 416 and 434 may also each include non-volatile memory for storing instructions to be executed by the processor modules 414 and 436, respectively.

The network communication module 418 generally represents the hardware, software, firmware, processing logic, and/or other components of the BS 402 that enable bi-directional communication between the transceiver 410 and other network components and communication nodes in communication with the BS 402. For example, the network communication module 418 may be configured to support internet or WiMAX traffic. In a deployment, without limitation, the network communication module 418 provides an 502.3 Ethernet interface such that the transceiver 410 can communicate with a conventional Ethernet based computer network. In this manner, the network communication module 418 may include a physical interface for connection to the computer network (e.g., Mobile Switching Center (MSC)). In some embodiments, the network communication module 418 includes a fiber transport connection configured to connect the BS 402 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   receiving, by a wireless communication device while the wireless communication device is in at least one of a radio resource control (RRC) idle state or an RRC-inactive state, from a wireless communication node, a downlink control message comprising a paging message, the downlink control message triggering the wireless communication device to transmit an uplink signal for positioning the wireless communication device; and
   sending, by the wireless communication device to the wireless communication node, in response to receiving the downlink control message and while the wireless communication device is in the RRC-idle state or the RRC-inactive state, the uplink signal comprising a preamble, the uplink signal configured for the wireless communication node to position the wireless communication device.

2. The method of claim 1, further comprising receiving, by the wireless communication device from the wireless communication node, assistance data, wherein the assistance data configures a time-domain behavior of the uplink signal to be as one of aperiodic, periodic, or semi-persistent.

3. The method of claim 2, wherein the assistance data is included in at least one of: a System Information Block (SIB), previous assistance data received when the wireless communication device was in an RRC-connected state, or scheduling information of the downlink control message.

4. The method of claim 1, further comprising:
   selecting, by the wireless communication device, a resource from a plurality of resources that is preconfigured for positioning; and
   sending, by the wireless communication device to the wireless communication node, the preamble using the selected resource, wherein the preamble corresponds to the uplink signal.

5. The method of claim 1, further comprising sending, by the wireless communication device to the wireless communication node, a Msg3 that carries at least one of a User Equipment Identifier (UEID) or a Positioning Identifier, wherein the Msg3 corresponds to the uplink signal that is configured for the wireless communication node to position the wireless communication device.

6. The method of claim 1, wherein the uplink signal is dedicated for the wireless communication device.

7. The method of claim 1, further comprising at least one of:
   receiving, by the wireless communication device from the wireless communication node, a Timing Advance (TA), wherein the TA was configured when the wireless communication device was in an RRC-connected state; or sending, by the wireless communication device to the wireless communication node, the uplink signal using the TA.

8. The method of claim 1, further comprising at least one of:
sending, by the wireless communication device to the wireless communication node, a first random access message;
receiving, by the wireless communication device from the wireless communication node, a second random access message indicating a TA, wherein the TA is measured based on the first random access message; or
sending, by the wireless communication device to the wireless communication node, the uplink signal using the TA.

9. The method of claim 1, further comprising sending, by the wireless communication device to the wireless communication node, the uplink signal using a spatial parameter, wherein the spatial parameter is selected according to a monitor occasion in which the downlink control message is received.

10. The method of claim 1, further comprising sending, by the wireless communication device to the wireless communication node, the uplink signal using a spatial parameter, wherein the spatial parameter is selected according to one or more information that corresponds to a Physical Random Access Channel (PRACH).

11. The method of claim 10, wherein the one or more information include at least one of: a Synchronization Signal Block (SSB), a Channel Status Information Reference Signal (CSI-RS), or a Control Resource Set (CORESET).

12. The method of claim 1, wherein the downlink control message includes one or more bits configuring to position the wireless communication device.

13. The method of claim 12, wherein the one or more bits are further configured to trigger at least one of: a transmission of a first reference signal, a transmission of a preamble, or a reception of a second reference signal.

14. The method of claim 13, wherein the first reference signal includes a Sounding Reference Signal (SRS), and the second reference signal includes a Position Reference Signal (PRS).

15. A method, comprising:
transmitting, by a wireless communication node to a wireless communication device while the wireless communication device is in at least one of a radio resource control (RRC) idle state or an RRC-inactive state, a downlink control message comprising a paging message, the downlink control message triggering the wireless communication device to transmit an uplink signal for positioning the wireless communication device; and
receiving, by the wireless communication node from the wireless communication device, in response to transmitting the downlink control message and while the wireless communication device is in the RRC-idle state or the RRC-inactive state, the uplink signal comprising a preamble, the uplink signal configured for the wireless communication node to position the wireless communication device.

16. A wireless communication device, comprising:
at least one processor configured to:
receive, via a transceiver while the wireless communication device is in at least one of a radio resource control (RRC) idle state or an RRC-inactive state, a downlink control message comprising a paging message, the downlink control message triggering the wireless communication device to transmit an uplink signal for positioning the wireless communication device; and
send, via the transceiver to the wireless communication node, in response to receiving the downlink control message and while the wireless communication device is in the RRC-idle state or the RRC-inactive state, the uplink signal comprising a preamble, the uplink signal configured for the wireless communication node to position the wireless communication device.

17. A wireless communication node, comprising:
at least one processor configured to:
transmit, via a transceiver to a wireless communication device while the wireless communication device is in at least one of a radio resource control (RRC) idle state or an RRC-inactive state, a downlink control message comprising a paging message, the downlink control message triggering the wireless communication device to transmit an uplink signal for positioning the wireless communication device; and
receive, via the transceiver from the wireless communication device, in response to transmitting the downlink control message and while the wireless communication device is in the RRC-idle state or the RRC-inactive state, the uplink signal comprising a preamble, the uplink signal configured for the wireless communication node to position the wireless communication device.

* * * * *